United States Patent
Nolan

[11] Patent Number: 5,873,452
[45] Date of Patent: Feb. 23, 1999

[54] ACCUMULATING CONVEYOR

[76] Inventor: John H. Nolan, 39283 E. Archer, Harrison Township, Mich. 48045

[21] Appl. No.: 956,896

[22] Filed: Oct. 23, 1997

[51] Int. Cl.⁶ .................... B65G 17/12; B65G 17/32
[52] U.S. Cl. .................... 198/465.3; 198/803.2; 198/867.13; 198/867.14; 198/867.15
[58] Field of Search .................... 198/465.3, 867.13, 198/867.14, 867.15, 803.2

[56] References Cited

U.S. PATENT DOCUMENTS

| Re. 33,811 | 2/1992 | Miller | 198/803.2 |
| 3,848,726 | 11/1974 | Wiemer | 198/108 |
| 3,888,344 | 6/1975 | Major | 198/219 |
| 3,949,859 | 4/1976 | Nussbaumer et al. | 198/19 |
| 3,973,669 | 8/1976 | Tabler | 198/130 |
| 4,062,444 | 12/1977 | Nakov et al. | 198/648 |
| 4,088,220 | 5/1978 | Jacksch et al. | 198/472 |
| 4,442,935 | 4/1984 | Gregg | 198/648 |
| 4,598,818 | 7/1986 | Miller | 198/803.2 |
| 4,681,212 | 7/1987 | Miller | 198/803.2 |
| 4,724,951 | 2/1988 | Shinkawa | 198/803.01 |
| 4,776,453 | 10/1988 | Miller | 198/803.2 |
| 4,793,261 | 12/1988 | Schwaemmle | 104/172.3 |
| 4,934,515 | 6/1990 | Linden | 198/803.2 |
| 5,029,691 | 7/1991 | Fein et al. | 198/346.1 |
| 5,105,935 | 4/1992 | Kohl | 198/781 |
| 5,178,261 | 1/1993 | Matheson et al. | 198/803.2 |
| 5,188,215 | 2/1993 | Riezler | 198/781 |
| 5,217,109 | 6/1993 | Youren | 198/781 |
| 5,259,173 | 11/1993 | Roberts et al. | 53/529 |
| 5,261,523 | 11/1993 | Gasior et al. | 198/465.3 |
| 5,265,400 | 11/1993 | Roberts et al. | 53/500 |
| 5,282,529 | 2/1994 | Schwammle | 198/465.3 |
| 5,389,045 | 2/1995 | Lyons | 474/113 |
| 5,407,058 | 4/1995 | Gyger | 198/465.3 |

*Primary Examiner*—Joseph E. Valenza
*Assistant Examiner*—Mark Deuble
*Attorney, Agent, or Firm*—Joseph G. Burgess

[57] ABSTRACT

An endless loop accumulating conveyor of the over/under type adapted to slidably support pallets and to frictionally transport them over both the upper and lower conveyor runs. The conveyor including a coupling to couple the pallet to the endless loop including a pin inserted into the endless loop to couple the pallet to the endless loop when the pallet is in the proximity of the curvilinear ends of the conveyor.

12 Claims, 4 Drawing Sheets

ACCUMULATING CONVEYOR

BACKGROUND OF THE INVENTION

1. Field of the Invention

The present invention is drawn to an accumulating conveyor capable of allowing pallets carried thereon to slip in location and, more specifically, to a coupling that couples the pallets to the conveyor during travel over the ends of the conveyor.

2. Description of the Related Art

Accumulating conveyors, often referred to as over-under conveyors, utilize an endless chain positioned about a pair of end sprockets. The chain is driven through a path including upper and lower horizontal sections joined by curved sections. In operation, the pallet is frictionally transported along the upper horizontal section and conveys a part. Since the chain is continuous, each pallet is frictionally returned on the lower horizontal section or underside of the conveyor. In accordance with the design of such conveyors, the pallets must be transferred around the curved ends of the conveyors. During travel through the curved sections of the conveyor, the pallets are attached to the chain. Systems for attaching the pallet to the chain are known, see specifically U.S. Pat. Nos. 4,934,515, 4,776,453 and 4,088,220. The systems shown therein are complex and may not provide a positive latch between the chain and the pallet. Accordingly, it is a principal object of the present invention to provide a coupling to couple a pallet to a chain during travel through the curved section of the conveyor.

SUMMARY OF THE INVENTION

The present invention is a coupling for use with an accumulating conveyor. Accumulating conveyors include an endless flexible loop member, typically a chain disposed about two sprockets, defining upper and lower rectilinear paths joined on opposite ends by curvilinear paths. A pallet is slidably supported on the chain and is frictionally transported over the rectilinear paths. The coupling couples the pallets to the chain for travel through the curvilinear paths. The coupling, according to the present invention, includes a pin attached to the pallet adjacent the chain. The pin is biased away from the chain during travel of the pallet along the rectilinear sections. Upon engaging the curvilinear section, the pin is driven between adjacent links of the chain by a cam surface to couple the pallet to the chain. Upon reaching the end of the curvilinear section, the pin is withdrawn from the chain and the pallet frictionally engages the chain for travel along the conveyor.

One advantage of the present invention is that each sprocket includes a hub forming the cam surface. Thus, when the pallet approaches either sprocket, the pin contacts the hub and is urged into contact with the chain. After the pallet completes its travel through the curvilinear section, the pin loses contact with the hub and correspondingly disengages the chain allowing for frictional travel along either the upper or lower rectilinear paths.

Other features and advantages of the present invention will be readily appreciated as the same becomes better understood after reading the subsequent description taken in conjunction with the accompanying drawings.

DETAILED DESCRIPTION OF THE PREFERRED EMBODIMENT(S)

Figure 1:
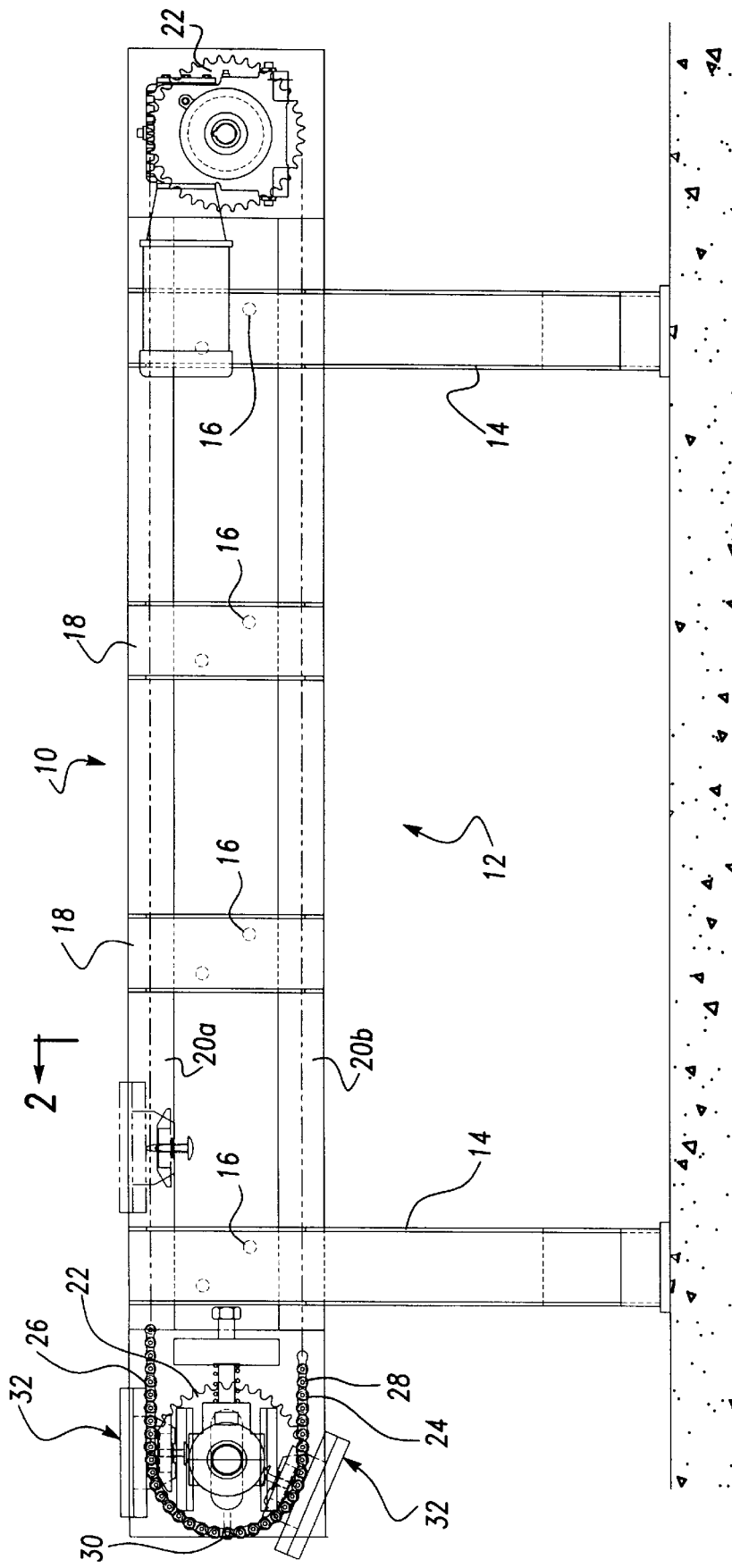
FIG. 1 is a side view of an accumulating conveyor in accordance with the present invention.
Figure 2:
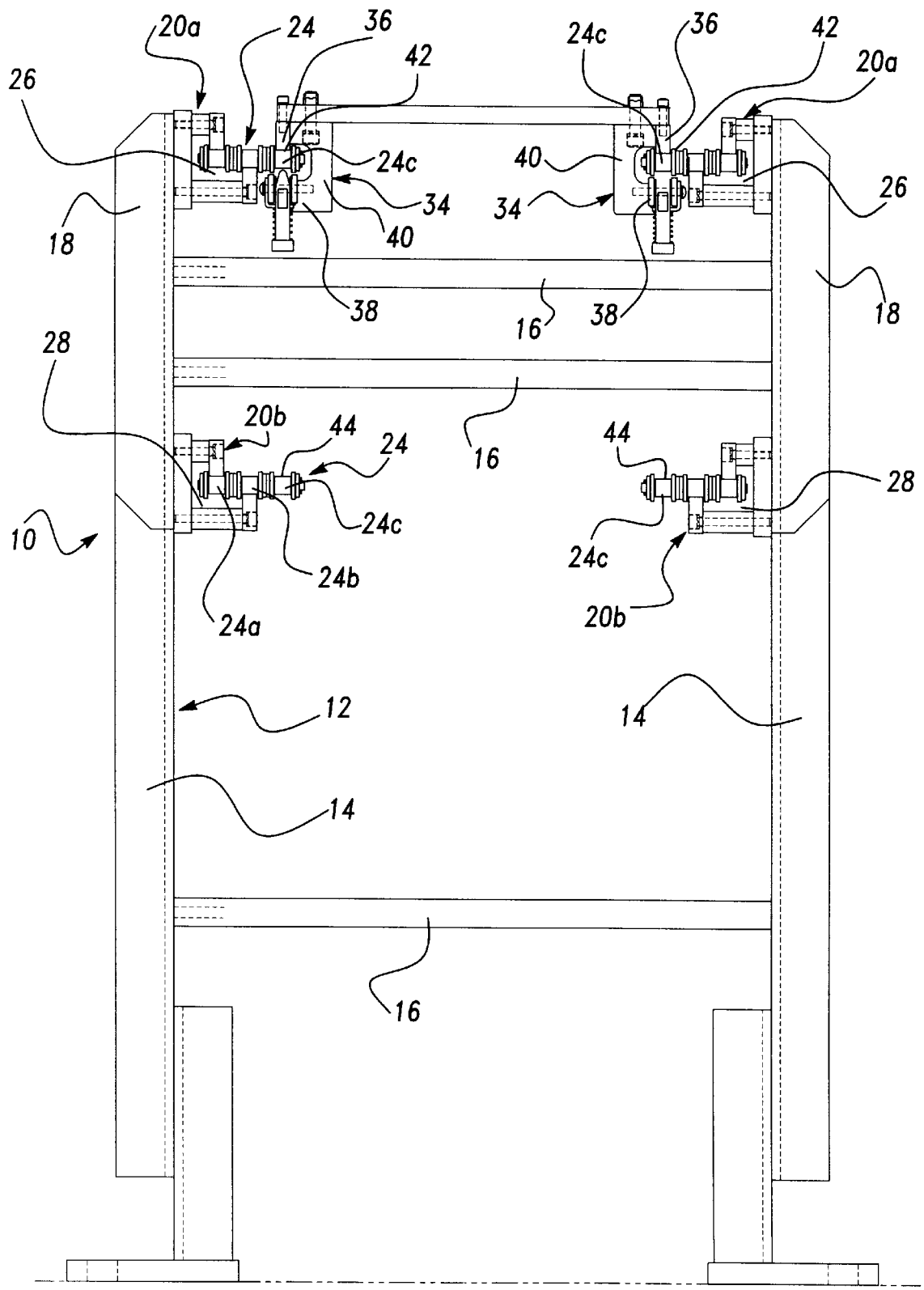
FIG. 2 is a sectional view of the conveyor illustrated in FIG. 1 taken along lines 2—2.
Figure 3:
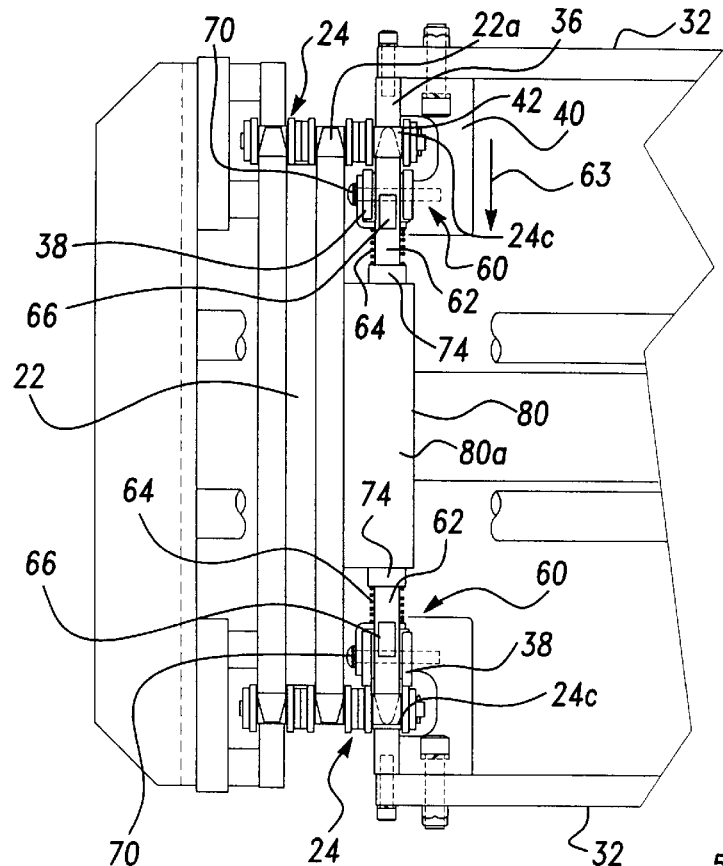
FIG. 3 is an end view of the conveyor system illustrated in FIG. 1 with portions removed for clarity.

Referring to FIGS. 1 and 2, there is shown an accumulating conveyor 10 according to the present invention. The accumulating conveyor 10 includes a frame assembly, seen generally at 12, including a plurality of upright members 14 interconnected by brace members 16. Upper and lower chain guide rails 20a, 20b are secured to side supports 18 and upright members 14. Sprockets 22 are positioned at each end of the frame assembly 12. An endless chain 24, having three strands 24a, 24b and 24c, is disposed about the sprockets 22 and positioned within the upper and lower chain guide rails 20a, 20b. The upper and lower guide rails 20a, 20b and sprockets 22 define the chain path as follows: upper guide rail 20a defines an upper rectilinear path 26, lower guide rail 20b defines a lower rectilinear path 28 and the circumference of the sprockets 22 defines the curvilinear paths 30 connecting each end of the upper and lower rectilinear paths. An article carrier or pallet 32 is positioned on the chain 24. The pallet 32 includes a frictional drive assembly 34 that cooperates with the chain 24 to move the pallet 32 with the chain 24. The frictional drive assembly 34 includes an upper support 36 and an lower support 38 interconnected by a mounting bracket 40. As best seen in FIG. 3, when the pallet 32 is on the upper rectilinear path 26, it is supported on the chain 24 by engagement of the upper support 36 with the upper surface 42 of the outer strand 24c of the chain 24. When the pallet 32 is on the lower rectilinear path 28, it is suspended in an upside down position with the lower support 38 engaging the inner surface 44 of the outer strand 24c of the chain 24.

Figure 5:
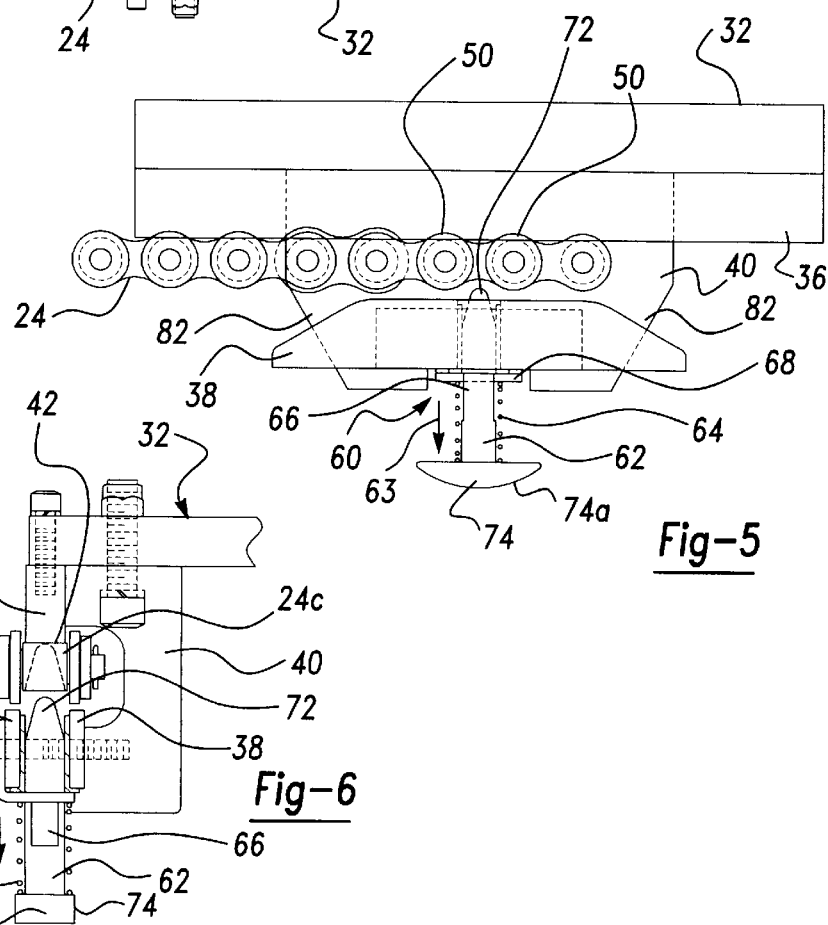
FIG. 5 is a fragmentary view of the pallet and coupling assembly according to the present invention.
Figure 6:
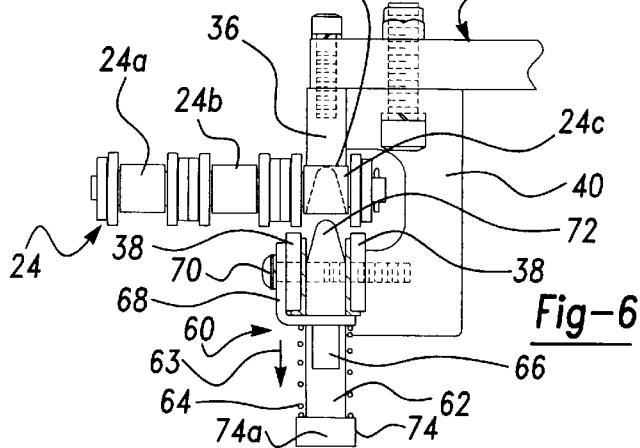
FIG. 6 is a side view of the pallet and coupling assembly illustrated in FIG. 5.
Figure 4:
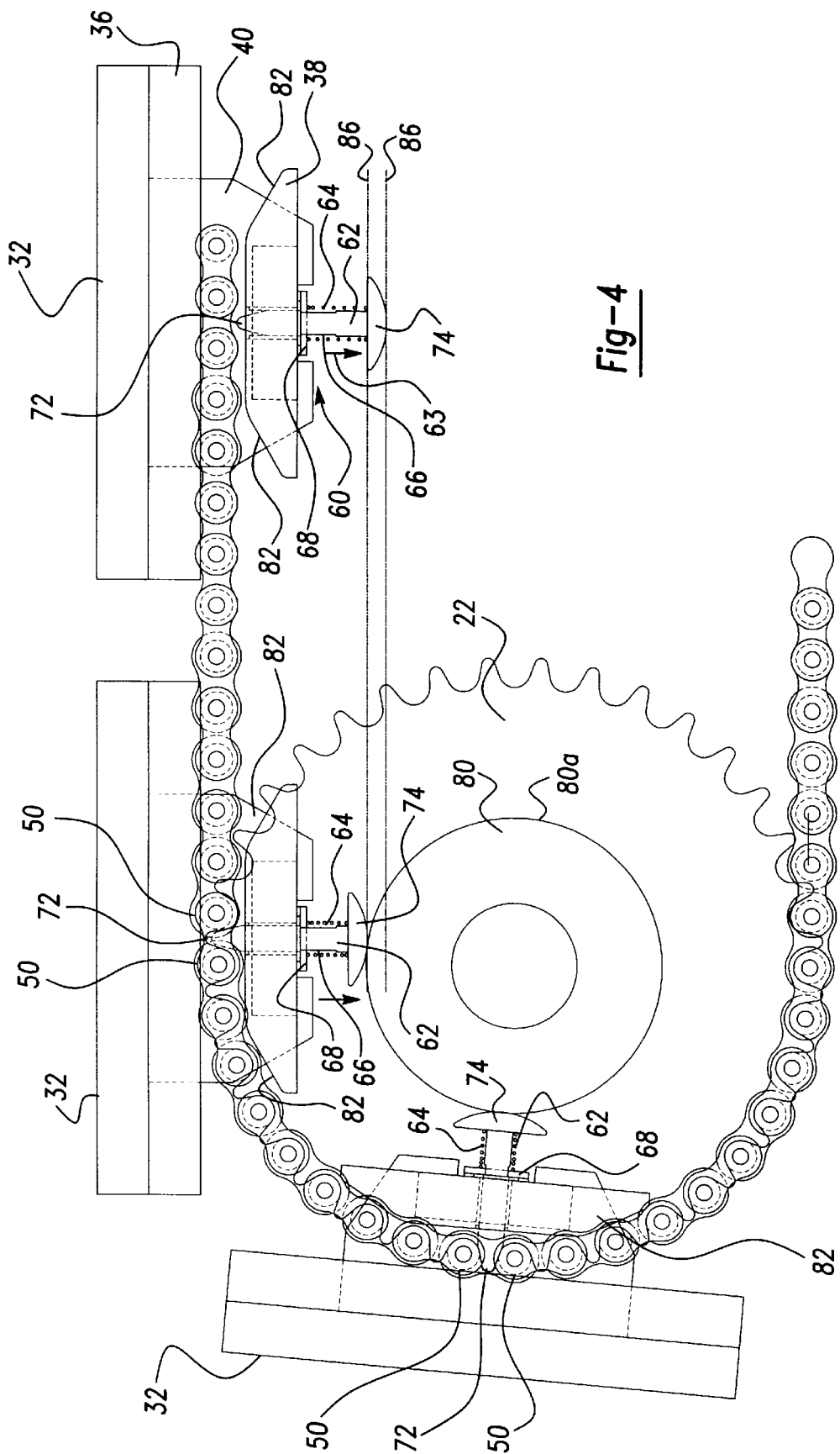
FIG. 4 is an enlarged fragmentary sectional view of one end of the conveyor system of FIG. 1.

As seen best in FIGS. 3 through 6, the lower support 38 includes a coupling, seen generally at 60, to couple the pallet 32 to the chain 24 during its movement about the curvilinear path 30 defined by the outer circumference of the sprocket 32. As set forth above, the curvilinear path 30 extends between the upper rectilinear path 26 and the lower rectilinear path 28. It is desirous to couple the pallet 32 to the chain 24 to control the movement of the pallet 32 during its travel along the curvilinear path 30. When the pallet 32 reaches the end of either the upper or lower rectilinear paths 26, 28, the coupling 60 is activated to couple the pallet 32 to the chain 24. As shown in FIGS. 4 through 6, the coupling 60 includes a pin 62 slidably mounted in the lower support 38. A spring 64 or other biasing member is positioned over the pin 62 and forces the pin 62 outwardly away from the chain 24 in the direction shown by the arrow 63. As illustrated in FIG. 5, the pin 62 has flat surfaces 66 thereon that cooperate with a slotted L-shaped bracket 68, fastened to the lower support 38 with fasteners 70, to hold the pin 62 in place.

The pin 62 operates in a reciprocal plunger-like fashion. For instance, when a force is applied to the head 74 of the pin 62, it acts against the spring 64 and drives the opposite end 72 of the pin 62 between adjacent rollers 50 of the chain 24 (see FIG. 4). It is readily apparent that driving the pin 62 between adjacent rollers 50 of the chain 24 couples the pallet 32 to the chain and causes it to move with the chain 24. To facilitate entry of the pin 62 between adjacent rollers of the chain 24, the end 72 of the pin 62 is tapered. As shown, the coupling 60 provides a straight-forward and positive means to couple the pallet 32 to the chain 24.

FIG. 4 illustrates the head 74 of the pin 62 having an arcuate shape. In operation, the pin 62 is biased away from the chain 24 by the spring 64. However, upon reaching the end of either of the rectilinear paths 26, 28, the head 74 of the pin 62 engages a hub 80 of the sprocket 22. As shown in FIG. 3, the hub 80 extends laterally from the toothed portion 22a of the sprocket 22 to form a cylindrical surface 80a. The cylindrical surface 80a of the hub 80 forms a cam surface that drives the pin 62 into engagement with the chain 24 when the pallet 32 is traveling along the curvilinear path 30. The head 74 has an arcuate outer surface 74a. As the head 74 of the pin 62 engages the hub 80, the arcuate-shaped outer surface 74a cooperates with the cam surface of the hub 80 to smoothly drive the pin 62 into engagement with the chain 24 to couple the pallet 32 to the chain 24 when the pallet 32 is traveling in curvilinear path 30. As the pallet clears the curvilinear path 30, the head 74 of the pin 62 disengages or ceases to contact the cam surface of the hub 80 whereby the spring 64 withdraws the pin 62 from the chain 24 thus releasing or uncoupling the pallet 32 from the chain 24. The pallet 32 then travels along the rectilinear paths 26, 28 via frictional force. The distance of pin 62 travel upon release is shown in FIG. 4 by the dotted lines 86.

Additionally, the lower support 38 has beveled side surfaces 82 to provide clearance for the lower support 38 when the pallet is being transferred through the curvilinear chain path 30. The angle of the beveled side surfaces 82 is relative to the radius of the sprocket 22, the smaller the radius the more the side surfaces 82 must be beveled to prevent the side surfaces 82 from engaging the chain.

It will be seen that the coupling 60 works at both ends of the conveyor 10; i.e., it assists in smoothly lowering the pallet 32 from the upper rectilinear chain path 26 to the lower rectilinear chain path 28 and conversely provides a positive lift to lift the pallet 32 from the lower rectilinear chain path 28 to the upper rectilinear chain path 26. Thus, the present invention discloses a pin 62 driven into the chain 24 during travel of the pallet 32 about the curvilinear path using the hub 80 as a cam means to drive the pin 62 into the chain 24 to lock the pallet 32 to the chain 24.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

What is claimed is:

1. An accumulating conveyor comprising:
   an endless flexible loop member traveling in a path including an upper rectilinear path and a lower rectilinear path extending between and joined by two curvilinear paths;
   a pallet slidably supported on said endless flexible loop and frictionally transported over said upper and lower rectilinear paths;
   a coupling operative to couple said pallet to said endless flexible loop during travel of said pallet on said curvilinear paths, said coupling including a pin mounted for reciprocal movement on said pallet adjacent said flexible loop; and
   a cam surface positioned proximate said curvilinear path, said pin engaging said cam surface when said pallet travels on said curvilinear path such that said cam surface drives said pin into contact with said endless flexible loop to couple said pallet to said endless flexible loop.

2. An accumulating conveyor as set forth in claim 1 wherein said pallet includes an upper support and a lower support for supporting said pallet on said flexible endless loop; and said pin mounted for reciprocal movement on said lower support.

3. An accumulating conveyor as set forth in claim 1 wherein said flexible endless loop includes a chain, said chain is disposed over and movable on a pair of sprockets, each of said sprockets including a hub forming said cam surface.

4. An accumulating conveyor as set forth in claim 2 including said pin having an arcuate shaped head and a spring extending between said lower support and said arcuate shaped head to bias said pin away from said endless flexible loop.

5. An accumulating conveyor as set forth in claim 4 wherein said cam surface is formed by a hub of a sprocket mounted to said frame.

6. An accumulating conveyor as set forth in claim 3 wherein said pin is mounted on a lower support of said pallet.

7. An accumulating conveyor comprising:
   a frame;
   first and second sprockets secured to said frame;
   an endless chain supported on said frame in a chain path, said chain path having upper rectilinear path and a lower rectilinear path interconnected by curvilinear paths;
   a pallet slidably supported on said endless chain for frictional travel along said rectilinear paths by upper and lower support surfaces;
   a coupling connected to said pallet, said coupling including a pin mounted on said lower support surface for-reciprocal movement;
   a spring positioned adjacent said pin and acting to bias said pin outwardly away from said endless chain; and
   a cam surface positioned adjacent said curvilinear path, said cam surface driving said pin into engagement with said endless chain to couple said pallet to said endless chain during travel of said pallet about said curvilinear path.

8. An accumulating conveyor as set forth in claim 7 including a slotted L-shaped bracket secured to said pallet, said L-shaped bracket cooperating with a flat surface on said pin to limit the travel of said pin.

9. An accumulating conveyor as set forth in claim 8 wherein said pin includes a head, the heat having an arcuate shape that contacts said cam surface.

10. An accumulating conveyor as set forth in claim 8 wherein said first and second sprockets engage said chain at said curvilinear path of said chain path; and said cam surface is formed by a hub located on said first and second sprockets.

11. An accumulating conveyor as set forth in claim 9 wherein said pin includes a tapered end to facilitate entry of said pin into said chain to couple said pallet to said chain.

12. An accumulating conveyor comprising:
    a frame;
    first and second sprockets secured to said frame;
    an endless chain supported on said frame and traveling in a chain path, said chain path including an upper rectilinear path and a lower rectilinear path interconnected at each end by curvilinear paths, wherein said sprockets engage said chain at said curvilinear paths;

a pallet slidably supported on said endless chain for frictional travel along said rectilinear portion;

a coupling connected to said pallet, said coupling including a pin mounted for reciprocal movement on a lower support surface of said pallet, said pin including an arcuate shaped head and a tapered end;

a spring disposed between said arcuate shaped head and said lower support surface, said spring acting biasing said pin outwardly away from said endless chain; and said sprockets including laterally extending hubs, said hubs forming a cam surface for driving said pin into engagement with said endless chain to couple said pallet to said endless chain during travel about said curvilinear path.

* * * * *